United States Patent
Tu et al.

(10) Patent No.: US 11,231,392 B2
(45) Date of Patent: Jan. 25, 2022

(54) DETECTING DEVICE AND METHOD THEREOF

(71) Applicant: INDUSTRIAL TECHNOLOGY RESEARCH INSTITUTE, Hsinchu (TW)

(72) Inventors: Chung-Fan Tu, Taipei (TW); Hau-Wei Wang, New Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 759 days.

(21) Appl. No.: 15/847,599

(22) Filed: Dec. 19, 2017

(65) Prior Publication Data

US 2018/0180575 A1 Jun. 28, 2018

Related U.S. Application Data

(60) Provisional application No. 62/439,447, filed on Dec. 27, 2016.

(30) Foreign Application Priority Data

Sep. 14, 2017 (TW) ................................. 106131640

(51) Int. Cl.
*G01N 27/90* (2021.01)
*G01N 27/904* (2021.01)

(52) U.S. Cl.
CPC ....... *G01N 27/9006* (2013.01); *G01N 27/904* (2013.01); *G01N 27/9086* (2013.01); *G01N 27/9046* (2013.01)

(58) Field of Classification Search
CPC ........... G01N 27/9033; G01N 27/9086; G01N 27/904; G01N 27/9046

(Continued)

(56) References Cited

U.S. PATENT DOCUMENTS 3,942,377 A 3/1976 Ginzburg
4,000,458 A 12/1976 Miller (Continued)

FOREIGN PATENT DOCUMENTS

CN 201173966 Y 12/2008
CN 101971016 A 2/2011

(Continued)

OTHER PUBLICATIONS

Yunze He et al., "Pulsed eddy current technique for defect detection in aircraft riveted structures," NDT&E International, vol. 43, Nov. 12, 2009, pp. 176-181.

(Continued)

*Primary Examiner* — Farhana A Hoque
(74) *Attorney, Agent, or Firm* — Muncy, Geissler, Olds and Lowe, P.C.

(57) ABSTRACT

A detecting device includes a first coil, a third coil, a second coil, and a fourth coil. The first coil generates a first magnetic field on a to-be-measured object. The third coil generates a third magnetic field under the to-be measured object. The second coil generates a second magnetic field. After the fourth coil receives the second magnetic field, a voltage is induced. The induced voltage is amplified by an amplify circuit to drive the third coil. The directions of the currents generated by the first coil and the third coil, respectively, are the same.

62 Claims, 4 Drawing Sheets
(1 of 4 Drawing Sheet(s) Filed in Color)

(58) Field of Classification Search
USPC .......................................................... 324/242
See application file for complete search history.

(56) References Cited

U.S. PATENT DOCUMENTS

| | | | |
|---|---|---|---|
| 4,042,876 | A | 8/1977 | Visioli, Jr. |
| 5,130,651 | A | 7/1992 | Morrey, Jr. |
| 5,559,428 | A | 9/1996 | Li |
| 5,731,697 | A | 3/1998 | Li |
| 6,326,777 | B2 | 12/2001 | Penny |
| 8,013,600 | B1 | 9/2011 | Yepez, III |
| 8,063,631 | B2 | 11/2011 | Fermon |
| 2002/0027437 | A1 | 3/2002 | Tasca |
| 2002/0130659 | A1 | 9/2002 | Wincheski |
| 2003/0071615 | A1 | 4/2003 | Schlicker |
| 2005/0104585 | A1 | 5/2005 | Bilik |
| 2013/0187643 | A1 | 7/2013 | Lysen et al. |
| 2013/0293026 | A1* | 11/2013 | Miyamoto .............. H02J 50/70 307/104 |
| 2014/0039830 | A1 | 2/2014 | Huang |
| 2015/0262893 | A1* | 9/2015 | Nakamura .............. H01L 22/14 438/10 |
| 2015/0362340 | A1* | 12/2015 | Montagne ............. G03F 7/7085 324/207.17 |
| 2016/0109486 | A1* | 4/2016 | Yanagisawa ............ G01R 15/16 324/120 |
| 2016/0195497 | A1* | 7/2016 | Kudyakov ............... G01R 3/00 324/238 |

FOREIGN PATENT DOCUMENTS

| | | |
|---|---|---|
| JP | 2012225930 A | 11/2012 |
| TW | 200506319 | 2/2005 |
| TW | 200935508 | 8/2009 |
| TW | 201326805 | 7/2013 |
| TW | 201326805 A1 | 7/2013 |
| TW | I509242 | 11/2015 |
| TW | 201621312 A | 6/2016 |

OTHER PUBLICATIONS

Veeraraghavan Sundararaghavan et al., "A multi-frequency eddy current inversion method for characterizing conductivity gradients on water jet peened components," NDT&E International, vol. 38, Mar. 9, 2005, pp. 541-547.

Yunze He et al., "Defect characterisation based on pulsed eddy current imaging technique," Sensors and Actuators A, vol. 164, Sep. 15, 2010, pp. 1-7.

* cited by examiner

DETECTING DEVICE AND METHOD THEREOF

CROSS-REFERENCE TO RELATED APPLICATIONS

This non-provisional application claims priority under 35 U.S.C. § 119(a) on patent application Ser. No. 62/439,447 filed in U.S. on Dec. 27, 2016, and Taiwan application Serial No. 106131640, filed on Sep. 14 2017, the entire contents of which are hereby incorporated by reference.

TECHNICAL FIELD

The present application relates to a detecting device and a detecting method.

BACKGROUND

The use of roll to roll (R2R) process to produce electronic products is booming, for example, a flexible printed circuit board, a conductive thin film, and so on. Conductive films are coated or printed on a substrate. The characteristics (for example, uniformity, conductivity, permeability, or thickness) and defects of the sheet resistance of the conductive thin film will directly affect the performance of the follow-up electronic products, and thus it is necessary to measure the sheet resistance of the conductive thin film.

The non-contact measuring device could measure the characteristics and the defects of a to-be-measured object without destroying the to-be-measured object. The non-contact measuring device has many ways of sensing, one of which is the use of the eddy current principle to sense. Traditional eddy current probes use the probe of unilateral eddy current for the measurement. In such a way, the measured value is very sensitive to the displacement of the to-be-measured object, such as a non-stationary movement. In addition, when measuring a large-sized to-be-measured object, the probe's connection wire is limited to a large-sized machine. While the moving machine may be pulling or vibrating at the conductive wire due to the too long length of the conductive wire, which results in measurement errors, for example, the measurement errors of the values of sheet resistance and the permeability.

SUMMARY

One exemplary embodiment of the present disclosure relates to a detecting device. The detecting device includes: a first coil, generating a first magnetic field on a to-be-measured object; a third coil, generating a third magnetic field below the to-be-measured object; a second coil, generating a second magnetic field; a fourth coil, wherein a voltage is induced after the fourth coil receives the second magnetic field, and the voltage is amplified by an amplify circuit to drive the third coil; wherein a first current generated by the first magnetic field and a third current generated by the third magnetic field have a same direction.

Another exemplary embodiment of the present disclosure relates to a detecting device. The detecting device includes: a first coil set, generating a main magnetic field on a to-be-measured object through a main circuit; a second coil set, generating a compensation magnetic field below a to-be-measured object through a compensation circuit; wherein a first current generated by the main magnetic field and a second current generated by the compensation magnetic field magnetic field have a same direction.

One exemplary embodiment of the present disclosure relates to a detecting method. The method includes: providing a first alternating current (AC), by a main circuit, to generate, via a first coil set, a main magnetic field on a to-be-measured object; and providing a second alternating current, by a compensation circuit, to generate, via a second coil set, a compensation magnetic field below a to-be-measured object; wherein a first current generated by the main magnetic field and a second current generated by the compensation magnetic field have a same direction.

The foregoing will become better understood from a careful reading of a detailed description provided herein below with appropriate reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

Figure 1:
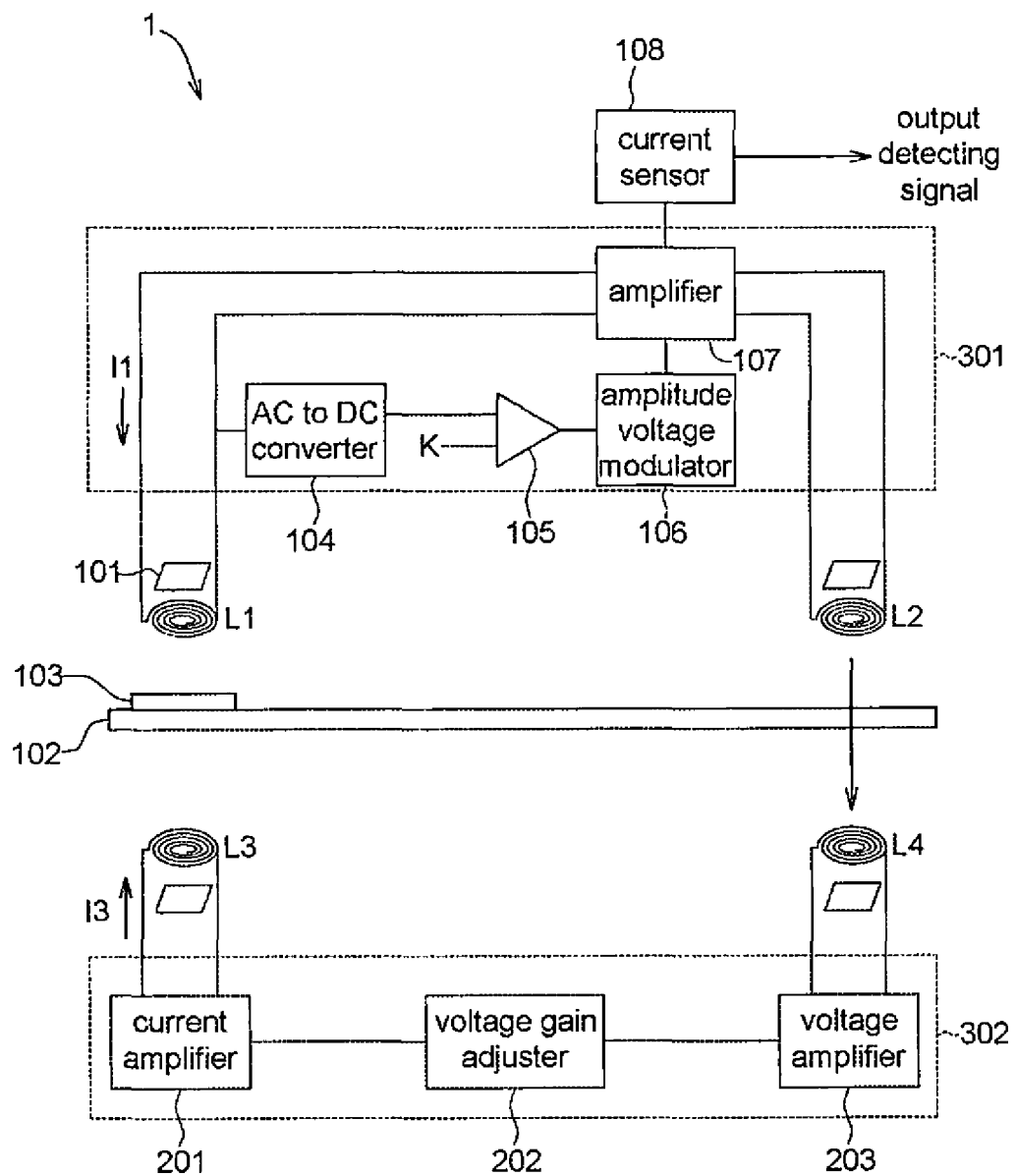
FIG. 1 illustrates a block diagram of a detecting device, according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The present disclosure uses two groups of upper and lower coils. A first group of upper and lower coils generates an upper and lower symmetrical magnetic field to reduce the impact of vibration. A second group of upper and lower coils serves as a magnetic coupling signal to reduce the impact of interference due to the lengths of wires connected to the coils are too long. In the disclosure, the coil could be, but not limited to inductance, the wire on the printed board, or equivalent inductance.

FIG. 1 is a block diagram illustrating a detecting device 1, according to an exemplary embodiment. In FIG. 1, a to-be-measured object 103 (for example, a conductive sample, which may be a thin film) is coated or printed to a non-conductive board 102. The detecting device includes two groups of upper and lower coils, the first group of upper and lower coils are denoted by an upper coil L1 and a lower coil L3, respectively. Wherein L1 and L3 are parallel. The second group of upper and lower coils are denoted by an upper coil L2 and a lower coil L4 respectively. Wherein L2 and L4 are parallel. The two coils L1 and L2 are formed as a first coil set, and the two coils L3 and L4 are formed as a second coil set. The probe of the detecting device (including L1, L2, L3, and L4) and the to-be-measured object 103 have no contact with each other, and the to-be-measured object 103 would not be destroyed.

The upper coil L1 of the first group generates a main magnetic field on the to-be-measured object 103 by an alternating current. The lower coil L3 of the first group generates a compensation magnetic field below the to-be-measured object 103 by an alternating current. A uniform magnetic field is generated between the upper coil L1 of the first group and the lower coil L3 of the first group by the main magnetic field and the compensation magnetic field. The magnetic field lines of the uniform magnetic field are perpendicular to the to-be-measured object 103. The uniform magnetic field is an alternating magnetic field used to offset the influence of the vibration of the to-be-measured object 103 when the to-be-measured object 103 is measured. The main magnetic field and the compensation magnetic field are symmetric. In one exemplary embodiment, the cores of the coils L1, L2, L3, and L4 are in the form of sheets or columnar. In one exemplary embodiment, the coils L1, L2, L3, and L4 are horizontally winding, respectively. In one exemplary embodiment, the coils L1, L2, L3, and L4 may have their respective multiple winding coils.

Figure 2:
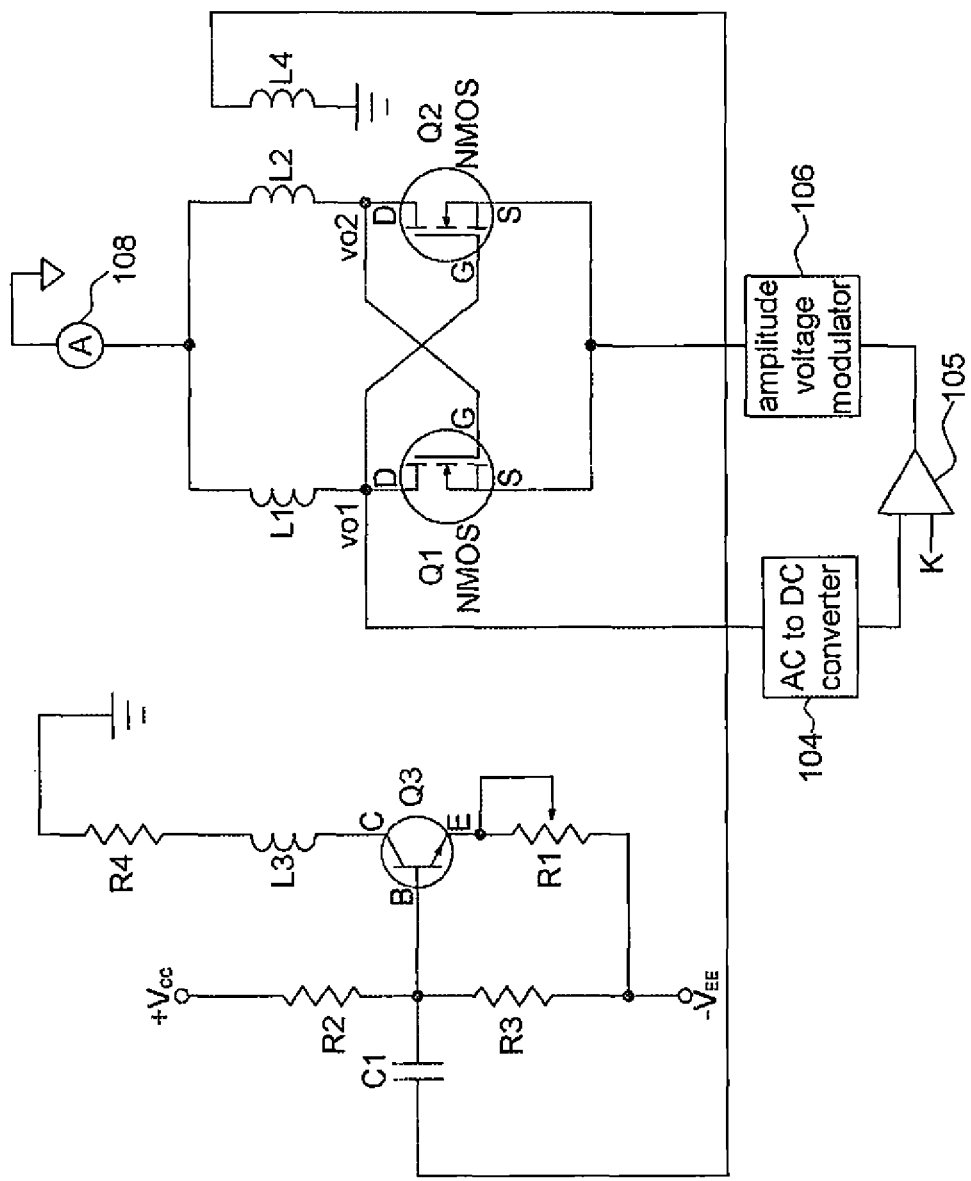
FIG. 2 illustrates a circuit diagram of a detecting device, according to an exemplary embodiment of the disclosure.

In FIG. 1, an AC-to-DC converter 104, an error amplifier 105, an amplitude voltage modulator 106, and amplifier 107 form a main circuit 301. The main circuit 301 is one exemplary embodiment of the disclosure. The upper coil L1 of the first group and the upper coil L2 of the second group are amplified by the amplifier 107 for forming the positive feedback. The amplifier 107 could be two power amplifiers. The two power amplifiers self-oscillate and provide feedback mutually to form a positive feedback self-oscillation. The two power amplifiers are Q1 and Q2 in FIG. 2. In one exemplary embodiment, the power amplifiers Q1 and Q2 are formed in pair. FIG. 2 illustrates a circuit diagram of a detecting device, according to an exemplary embodiment. Q1 and Q2 could be NMOS (n-channel MOSTET (Metal-Oxide-Semiconductor Field-Effect Transistor)) or PMOS (p-channel MOSTET), and could be any amplifier which can oscillate self with positive feedback. In one exemplary embodiment, the amplifiers Q1 and Q2 are current amplifiers. In another exemplary embodiment, the amplifiers Q1 and Q2 are power amplifiers. But the scope of the disclosure is not limited to the aforesaid embodiments.

Figure 4:
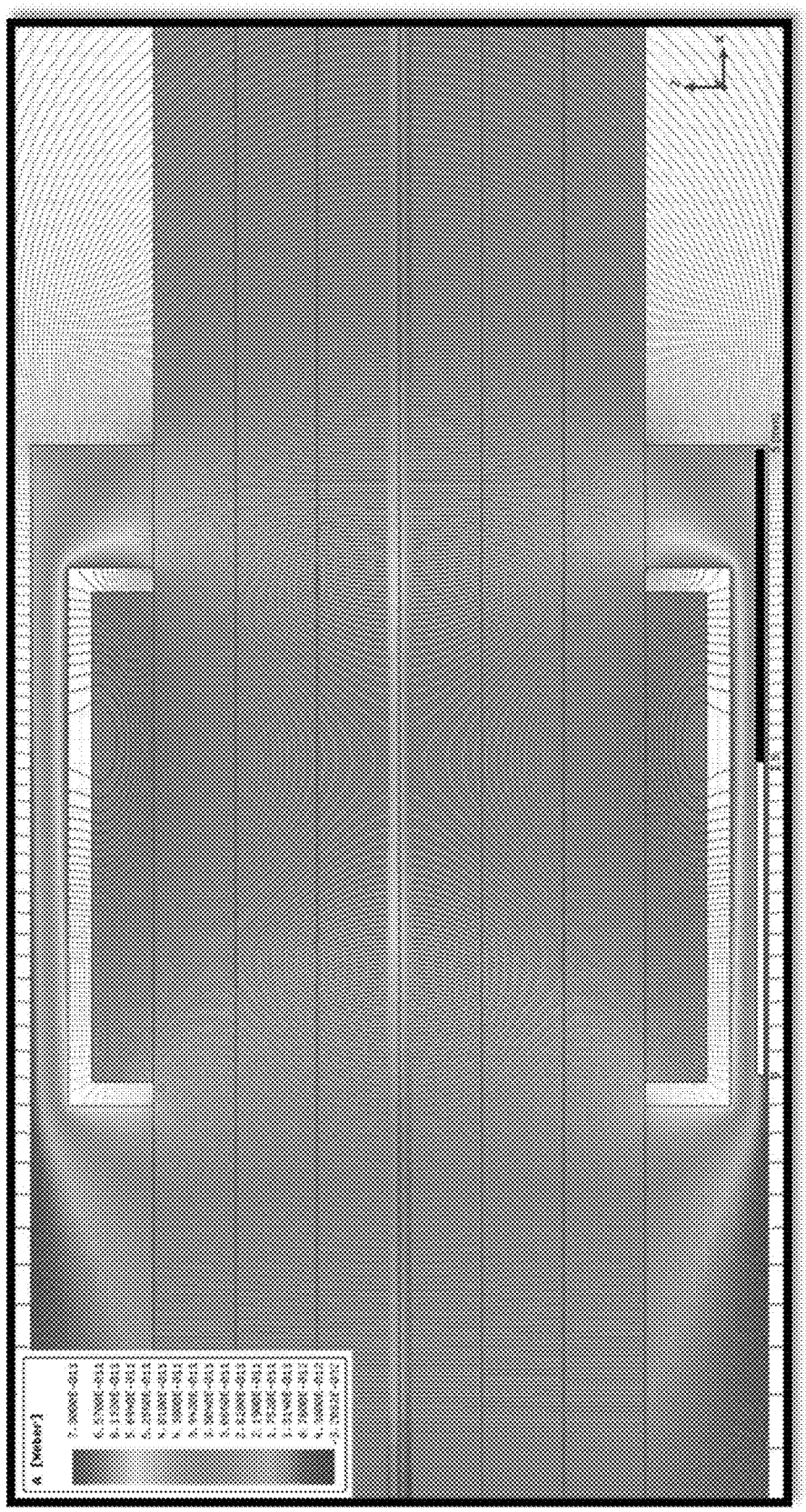
FIG. 4 illustrates a simulation diagram of magnetic potential on condition of the currents of the upper and lower coils having the same direction.

In FIG. 1, a current amplifier 201, a voltage gain adjuster 202, and a voltage amplifier 203 form a compensation circuit 302. The compensation circuit 302 is an amplifying circuit, and is one exemplary embodiment in our disclosure. In one exemplary embodiment, the voltage amplifier 203 is a multi-stage amplifier. The current output of the amplifier 107 drives coils L1 and L2 through the amplifier 107 to produce an alternating magnetic field. The upper coil L2 of the second group produces a second magnetic field received by the lower coil L4 of the second group to induce a voltage (that is, an induced voltage). After the induced voltage is amplified by the voltage amplifier 203 and the voltage gain adjuster 202, a signal is output to the current amplifier 201. The current amplifier 201 drives the current I3 to flow into the lower coil L3 of the first group and drives the current I1 to flow into the upper coil L1 of the first group at the same time. The current I1 and the current I3 have the same direction (that is, the current I1 and the current I3 respectively flow into the coils L1 and L3 clockwise; or the current I1 and the current I3 respectively flow into the coils L1 and L3 counterclockwise). Please refer to FIG. 4.

When the alternating magnetic field between the first group of upper and lower coils L1 and L3 passes through the to-be-measured object 103, the to-be-measured object 103 induces an eddy current, wherein the magnitude of the eddy current is relevant to the characteristics of the to-be-measured object 103 (for example, uniformity, conductivity, permeability, defect and thickness, etc.). In addition, the eddy current induced by the to-be-measured object 103 radiates the secondary magnetic field against the change of the alternating magnetic field (that is, the primary magnetic field) generated by the first group of upper and lower coils L1 and L3, thereby resulting in the change of the eddy current. The change of the secondary magnetic field of the to-be-measured object 103 will be converted into the change value of the alternating current of the upper coil L1 of the first group, wherein the change value is converted into the detecting signal by the current sensor 108, wherein the current sensor 108 and the coils L1 and L2 are connected in series.

The change of the eddy current is an AC signal. In one exemplary embodiment, the AC signal is sent out by the amplifier 107 and is converted into a direct current (DC) signal by an AC-to-DC converter 104. An error amplifier 105 subtracts the DC signal from an input reference voltage K, and the difference is fed back to the amplifier 107 by the amplitude voltage modulator 106 to form a negative feedback. The negative feedback is a close-loop circuit, which starts from an output of the amplifier 107, and then passes through the AC-to-DC converter 104, and enters the error amplifier 105, and finally the negative feedback is formed by the amplitude voltage modulator 106. The close loop controls the amplitude of the oscillation voltage of the first group of upper and lower coils L1 and L3 to a constant value. The constant value is decided by the value of the reference voltage K. K is a constant value. K could be decided by cooperating with the to-be-measured object 103. When the close loop of the negative feedback reaches a steady state, the AC voltage amplitude of the upper coil L1 of the first group is a constant value.

FIG. 2 illustrates a circuit diagram of a detecting device, according to an exemplary embodiment. The upper coil L1 of the first group and the upper coil L2 of the second group form the positive feedback self-oscillation through the two amplifiers Q1 and Q2. The amplifier 107 outputs the current to drive the coils L1 and L2 to generate an alternating magnetic field. The upper coil L2 of the second group generates a magnetic field, and the lower coil L4 of the second group converts a magnetic signal induced from the magnetic field to an induced voltage after receiving the magnetic signal. The induced voltage amplified by an amplifier (for example, the amplifier Q3, that is the two amplifiers 201 and 203 in FIG. 1) is outputted to drive the lower coil L3 of the first group and the upper coil L1 of the first group to generate their respective currents in a same direction. The output current of the amplifier Q3 drives the change of the AC produced by the coils L1 and L3 which are located on and below the to-be-measured object 103, respectively. In addition, the eddy current induced by the to-be-measured object 103 radiates a secondary magnetic field against the change of the alternating magnetic field (that is, the primary magnetic field) generated by the upper coil L1 of the first group and the lower coil L3 of the first group. The output of the power amplifier Q1 is sent to an AC-to-DC converter 104 and is converted into a DC signal. An error amplifier 105 subtracts the DC signal from the reference voltage K, and the difference is fed back to the amplifier 107 by the amplitude voltage modulator 106 to form a close loop of negative feedback. The close loop controls the amplitude of the oscillation voltage of the upper coil L1 of the first group to be a constant value. When the negative feedback reaches steady state, the amplitude of the alternating voltage of the upper coil L1 of the first group is a constant value. The change of the secondary magnetic field of the to-be-measured object 103 is converted to the change value of the alternating current of the upper coil L1 of the first group. The change value is converted to a detecting signal by the current sensor 108. In one exemplary embodiment, Q3 is a current amplifier; in another exemplary embodiment, Q3 is a power amplifier; in yet another exemplary embodiment, the Q3 is a voltage amplifier; but the scope of the disclosure is not limited to the aforesaid embodiments.

Figure 3:
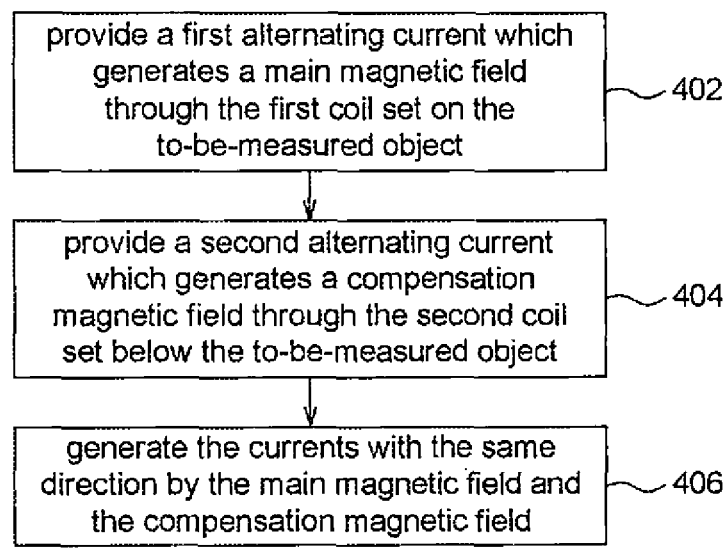
FIG. 3 illustrates a flow diagram of a detecting method, according to an exemplary embodiment of the disclosure.

According to the embodiments of the disclosure, a detecting method is provided. FIG. 3 illustrates a flow diagram of a detecting method, according to an exemplary embodiment. Please refers to FIG. 3. In step 402, the main circuit 301 provides a first alternating current to generate, via the first coil set L1 and L2, a main magnetic field on the to-be-measured object 103. The main magnetic field generates a current I1. In step 404, the compensation circuit 302 provides a second alternating current to generate, via the second coil set L3 and L4, a compensation magnetic field below the to-be-measured object 103. The compensation magnetic field generates a current I2. In step 406, the current I1 and the current I2 generated respectively by the main magnetic field and the compensation magnetic field have a same direction. (that is, the current I1 and the current I3 respectively flow into the coils L1 and L3 clockwise; or the current I1 and the current I3 respectively flow into the coils L1 and L3 counterclockwise). Please refer to FIG. 4.

In one exemplary embodiment of the detecting method, the main magnetic field and the compensation magnetic field generate a uniform magnetic field passing through the to-be-measured object 103. The uniform magnetic field is perpendicular to the to-be-measured object 103. The first coil set L1 and L2 passing through an amplifier forms a positive feedback self-oscillation to generate a first magnetic field. The first coil set L1 and L2 and the second coil set L3 and L4 that pass through the amplifier 107 generate an alternating magnetic. The output of the amplifier 107 is converted to a DC signal. The amplitude voltage modulator 106 subtracts the DC signal subtracts from the reference voltage K, and outputs the difference to the amplifier 107 to form a negative feedback. The feedback controls the amplitude of the voltage oscillation of the first coil set L1 and L2 to be a constant value. The constant value is decided by the reference voltage K. An eddy current is induced when the alternating magnetic field of the first coil set L1 and L2 passes through the to-be-measured object 103. The eddy current generates a second magnetic field. The value of the eddy current is changed owing to the second magnetic field is against the alternating magnetic field. The change value of the eddy current is converted to a detecting signal by the current sensor 108.

In one exemplary embodiment of our disclosure, the main circuit 301 provides an alternating current via the non-contact probe of eddy current on the both sides of the to-be-measured object 103 and generates a magnetic field. The induced current and the amplifier in the main circuit 301 form a positive feedback self-oscillation circuit. The amplitude of the voltage is controlled by the negative feedback of the main circuit 301 to reduce the measured error produced or affected by the vibration of the coil circuit. The voltage induced via the magnetic field generated by the second coil set L2 and L4 is amplified by the compensation circuit 302. The voltage signal fed back to the first coil set L1 and L3 is used to compensate the magnetic coupling signal. The current induced by the magnetic field generated by the main circuit 301 and the compensation circuit 302 have the same direction. The main circuit 301 and the compensation circuit 302 are separated from each other. The signals of the two separated circuits are transferred by the alternating magnetic field to reduce the impact of noise interference due to the lengths of wires connected to the upper and lower coils are too long.

The disclosure has described a detecting device and a detecting method. The illustrated steps are set out to explain the exemplary embodiments shown, and it should be anticipated that ongoing technological development will change the manner in which particular functions are performed. Thus, these examples are presented herein for illustration only, but not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It will be apparent to those skilled in the art that various modifications and variations can be made to the disclosure. It is intended that the specification and examples be considered as exemplary embodiments only, with a scope of the disclosure being indicated by the following claims and their equivalents.

What is claimed is:

1. A detecting device, comprising:
a first coil set, generating a main magnetic field toward a first side of a to-be-measured object through a main circuit, wherein the to-be-measured object further comprises a second side opposite to the first side; and
a second coil set, generating a compensation magnetic field toward the second side of the to-be-measured object through a compensation circuit;
wherein a first current generated by the main magnetic field and a second current generated by the compensation magnetic field magnetic field have a same direction;
wherein the first coil set forms a positive feedback through an amplifier.

2. The detecting device of claim 1, wherein the main magnetic field and the compensation magnetic field generate a uniform magnetic field.

3. The detecting device of claim 2, wherein the uniform magnetic field passes through the to-be-measured object.

4. The detecting device of claim 2, wherein the uniform magnetic field is perpendicular to the to-be-measured object.

5. The detecting device of claim 1, wherein the amplifier is composed of two amplifiers, and the two amplifiers self-oscillate and provide feedback mutually to form a positive feedback self-oscillation.

6. The detecting device of claim 1, wherein the first coil set and the second coil set generate an alternating magnetic field by the amplifier.

7. The detecting device of claim 1, wherein the compensation circuit is composed of at least one of a current amplifier, a voltage amplifier, and a voltage gain adjuster, wherein an output current of the voltage amplifier drives a change of an alternating current produced by the first coil set and the second coil set which are on and below the to-be-measured object, respectively.

8. The detecting device of claim 7, wherein the voltage amplifier is a multi-stage amplifier.

9. The detecting device of claim 1, wherein an output of the voltage amplifier is converted to a direct current signal and is subtracted from a reference voltage by an amplitude voltage modulator to form a negative feedback.

10. The detecting device of claim 9, wherein the negative feedback controls an amplitude of an oscillation of the first coil to be a constant value.

11. The detecting device of claim 10, wherein the constant value is decided by a value of the reference voltage.

12. The detecting device of claim 1, wherein the first coil set connects to a current sensor in series.

13. The detecting device of claim 1, wherein when an alternating magnetic field of the first coil set passes through the to-be-measured object, and the to-be-measured object induces an eddy current.

14. The detecting device of claim 13, wherein the eddy current generates a second magnetic field.

15. The detecting device of claim 14, wherein the value of the eddy current is changed owing to the second magnetic field is against an alternating magnetic field.

16. The detecting device of claim 15, wherein a change value of the eddy current is converted to a detecting signal by the current sensor.

17. The detecting device of claim 13, wherein a magnitude of the eddy current is relevant to at least one characteristics of the to-be-measured object.

18. The detecting device of claim 17, wherein the at least one characteristics of the to-be-measured object comprises uniformity, conductivity, permeability, defect and thickness.

19. The detecting device of claim 1, wherein the first coil set generates the main magnetic field on the to-be-measured object by an alternating current.

20. The detecting device of claim 1, wherein the second coil set generates the compensation magnetic field below the to-be-measured object by an alternating current.

21. The detecting device of claim 1, wherein a probe of the detecting device and the to-be-measured object have no contact with each other.

22. The detecting device of claim 1, wherein the first coil set and the second coil set are parallel.

23. The detecting device of claim 1, wherein cores of the first coil, the second coil, the third coil, and the fourth coil are in the form of sheets or columnar.

24. The detecting device of claim 1, wherein the main magnetic field and the compensation magnetic field are symmetric.

25. The detecting device of claim 1, wherein the coil of the first coil set and the second coil set are horizontally winding.

26. The detecting device of claim 1, wherein the first coil set and the second coil set have their respective multiple winding coils.

27. A detecting method, comprising:
providing, by a main circuit, a first alternating current to generate, via a first coil set, a main magnetic field toward a first side of above a to-be-measured object, wherein the to-be-measured object further comprises a second side opposite to the first side; and
providing, by a compensation circuit, a second alternating current to generate, via a second coil set, a compensation magnetic field toward the second side of below the to-be-measured object;
wherein a first current generated by the main magnetic field and a second current generated by the compensation magnetic field magnetic field have a same direction;
wherein the first coil set forms a positive feedback through an amplifier.

28. The detecting method of claim 27, wherein the main magnetic field and the compensation magnetic field generate a uniform magnetic field, and the uniform magnetic field is perpendicular to the to-be-measured object.

29. The detecting method of claim 27, wherein the first coil set generates a first magnetic field.

30. The detecting method of claim 29, wherein the first coil set and the second coil set generate an alternating magnetic field by the amplifier.

31. The detecting method of claim 29, wherein an output of a voltage amplifier is converted to a direct current signal and is subtracted from a reference voltage by an amplitude voltage modulator to form a negative feedback.

32. The detecting method of claim 31, wherein the negative feedback controls an amplitude of an oscillation of the first coil to be a constant value, and the constant value is decided by a value of the reference voltage.

33. The detecting method of claim 27, wherein when an alternating magnetic field of the first coil set passes through the to-be-measured object, the to-be-measured object induces an eddy current, and the eddy current generates a second magnetic field.

34. The detecting method of claim 33, wherein the value of the eddy current is changed owing to the second magnetic field is against an alternating magnetic field.

35. The detecting method of claim 34, wherein a change value of the eddy current is converted to a detecting signal by the current sensor.

36. A detecting device, comprising:
a first coil, generating a first magnetic field toward a first side of above a to-be-measured object, wherein the to-be-measured object further comprises a second side opposite to the first side;
a third coil, generating a third magnetic field toward the second side of below the to-be-measured object;
a second coil, generating a second magnetic field; and
a fourth coil, wherein a voltage is induced after the fourth coil receives the second magnetic field, and the voltage is amplified by a compensation circuit to drive the third coil;
wherein a first current generated by the first magnetic field and a third current generated by the third magnetic field have a same direction;
wherein the first coil and the second coil form a positive feedback through an amplifier.

37. The detecting device of claim 36, wherein the first magnetic field and the third magnetic field generate an uniform magnetic field.

38. The detecting device of claim 37, wherein the uniform magnetic field is perpendicular to the to-be-measured object.

39. The detecting device of claim 37, wherein the uniform magnetic field is generated between the first magnetic field and the third magnetic field.

40. The detecting device of claim 36, wherein the amplifier is composed of two amplifiers, and the two amplifiers self-oscillate and provide feedback mutually to form a positive feedback self-oscillation.

41. The detecting device of claim 36, wherein the amplifier drives the first coil and the second coil to generate an alternating magnetic field by the amplifier.

42. The detecting device of claim 36, wherein the compensation circuit is composed of at least one of a current amplifier, a voltage amplifier, a voltage gain adjuster.

43. The detecting device of claim 42, wherein the voltage amplifier is a multi-stage amplifier.

44. The detecting device of claim 36, wherein an output of the voltage amplifier is converted to a direct current signal, and the output is subtracted from a reference voltage by an amplitude voltage modulator to form a negative feedback.

45. The detecting device of claim 44, wherein the negative feedback controls an amplitude of the oscillation of the first coil to be a constant value.

46. The detecting device of claim 45, wherein the constant value is decided by a value of the reference voltage.

47. The detecting device of claim 36, wherein the first coil and the third coil connect to a current sensor in series.

48. The detecting device of claim 36, wherein when an alternating magnetic field between the first coil and the third coil passes through the to-be-measured object, and the to-be-measured object induces an eddy current.

49. The detecting device of claim 48, wherein the eddy current generates the second magnetic field.

50. The detecting device of claim 49, wherein the value of the eddy current is changed owing to the second magnetic field is against an alternating magnetic field.

51. The detecting device of claim 50, wherein a change value of the eddy current is converted to a detecting signal by the current sensor.

52. The detecting device of claim 48, wherein a magnitude of the eddy current is relevant to at least one characteristics of the to-be-measured object.

53. The detecting device of claim 52, wherein the at least one characteristics of the to-be-measured object comprises uniformity, conductivity, permeability, defect and thickness.

54. The detecting device of claim 36, wherein the first coil generates the first magnetic field on the to-be-measured object by an alternating current.

55. The detecting device of claim 36, wherein the third coil generates the third magnetic field below the to-be-measured object by an alternating current.

56. The detecting device of claim 36, wherein a probe of the detecting device and the to-be-measured object have no contact with each other.

57. The detecting device of claim 36, wherein the first coil and the third coil are parallel.

58. The detecting device of claim 36, wherein the second coil and the fourth coil are parallel.

59. The detecting device of claim 36, wherein cores of the first coil, the second coil, the third coil, and the fourth coil are in the form of sheets or columnar.

60. The detecting device of claim 36, wherein the first magnetic field and the third magnetic field are symmetric.

61. The detecting device of claim 36, wherein the first coil, the second coil, the third coil, and the fourth coil are horizontally winding.

62. The detecting device of claim 36, wherein the first coil, the second coil, the third coil, and the fourth coil have their respective multiple winding coils.

* * * * *